(No Model.)

P. MONTECINO.
CULTIVATOR AND PLANTER.

No. 425,337. Patented Apr. 8, 1890.

Witnesses:
James Shuhy

Inventor:
P. Montecino.
By, W. R. Stringfellow
Attorney.

UNITED STATES PATENT OFFICE.

PAUL MONTECINO, OF DONALDSONVILLE, LOUISIANA.

CULTIVATOR AND PLANTER.

SPECIFICATION forming part of Letters Patent No. 425,337, dated April 8, 1890.

Application filed September 2, 1889. Serial No. 322,812. (No model.)

*To all whom it may concern:*

Be it known that I, PAUL MONTECINO, a citizen of the United States, residing at Donaldsonville, in the parish of Ascension and State of Louisiana, have invented certain new and useful Improvements in a Cultivator; and I do declare the following to be a full, clear, and exact description of the invention, such as will enable others skilled in the art to which it appertains to make and use the same.

My invention has relation to improvements in combined furrow-openers and seeders; and it consists in the construction, novel combination, and adaptation of devices hereinafter specified and claimed.

The improvements will be fully understood from the following description and claim, when taken in connection with the annexed drawings, in which—

Figure 1:
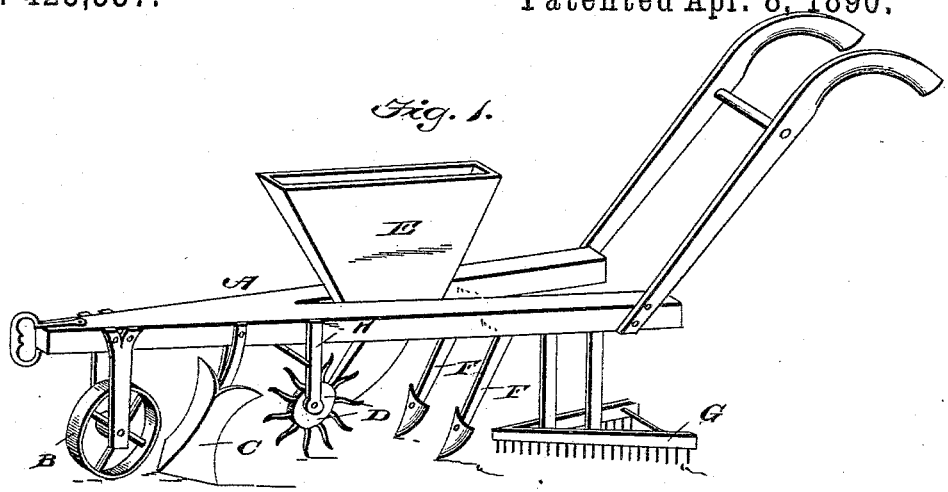
Figure 2:
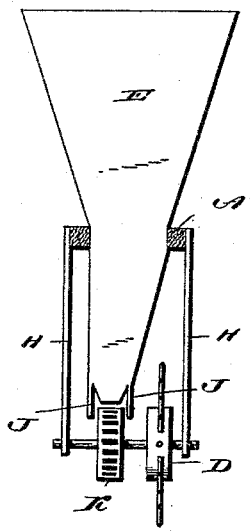

Figure 1 is a perspective view of my improved furrow-opener and seeder complete in an operative position, and Fig. 2 is a vertical transverse sectional view.

Referring to the annexed drawings by letter, A indicates the main frame of my improved apparatus, which may be of any ordinary or approved construction. This main frame is provided at its forward portion with an ordinary gage-wheel B, journaled in hangers depending therefrom.

C indicates a double-shovel furrow-opener. This furrow-opener, which is secured to the main beam by hangers in the usual manner, is arranged in advance of the seeding apparatus and serves to open a furrow for the reception of the discharged seed.

E indicates the hopper for the seed, which is arranged about midway of the length of the main beam. This seed-hopper E is provided with a depending discharge-spout, as shown, which has at its bottom portion two depending flanges J, for a purpose presently described.

D indicates an operating-wheel, which also serves as a marker for the seed to be deposited. This marker D is keyed on a shaft journaled in hangers H, secured to and depending from either side of the main beam, and it serves, in addition to a marker for the grain, as a means for rotating the cupped wheel, which is secured on the same shaft.

K indicates a wheel having a periphery of a width suitable for the formation of cups therein. These cups are so designed that they will receive the grain from the mouth of the hopper and may discharge it when they reach the lowest point of their revolution into the openings made by the spikes of the marker-wheel, which is designed in practice to be much nearer the cupped wheel than is shown in the drawings. The wheel K is so situated that its upper portion will pass between the depending flanges J of the hopper-mouth and thus prevents a lateral scattering of the seed discharged.

F indicates two following covering-shovels, which are secured by means of hangers to the main beam and which serve to cover the seed deposited.

G indicates a following-harrow, which is secured to the beam by means of the hangers L. (Shown in Fig. 1.) This harrow serves to break the clods covering the seed and also to even the surface of the ground.

I am aware that it is not new to employ a star-shaped wheel in connection with a hopper to deposit grain, and arrange an opening-shovel in advance of the wheel and covering-shovel in rear thereof, and I am also aware that the several parts of my device are old when separately considered and that many of them have been used in combination.

Having described my invention, what I claim is—

A cultivator comprising a main frame, a hopper supported therein, a gage-wheel journaled in the forward portion of the frame, a double shovel secured to the frame in rear of the wheel, a transverse shaft journaled in advance of the hopper-discharge, a cupped wheel secured to said shaft so as to enter the discharge-port of the hopper, a spiked wheel also secured to said shaft, covering-shovels following the said wheels, and a harrow following the covering-shovels, substantially as specified.

In testimony whereof I affix my signature in presence of two witnesses.

PAUL MONTECINO.

Witnesses:
GERARD MONTECINO,
JOHN RAMIREZ.